/

US011955624B2

(12) United States Patent
Chen et al.

(10) Patent No.: US 11,955,624 B2
(45) Date of Patent: Apr. 9, 2024

(54) BLENDED CATHODE MATERIALS FOR SECONDARY BATTERIES

(71) Applicant: SAFT AMERICA, Cockeysville, MD (US)

(72) Inventors: Xilin Chen, Lutherville Timonium, MD (US); Frank Cao, North Potomac, MD (US)

(73) Assignee: SAFT AMERICA, Cockeysville, MD (US)

( * ) Notice: Subject to any disclaimer, the term of this patent is extended or adjusted under 35 U.S.C. 154(b) by 238 days.

(21) Appl. No.: 17/084,374

(22) Filed: Oct. 29, 2020

(65) Prior Publication Data

US 2022/0140316 A1 May 5, 2022

(51) Int. Cl.
*H01M 4/36* (2006.01)
*H01M 4/02* (2006.01)
*H01M 4/505* (2010.01)
*H01M 4/525* (2010.01)
*H01M 4/58* (2010.01)
*H01M 10/0525* (2010.01)
*H01M 10/42* (2006.01)
*H01M 10/48* (2006.01)

(52) U.S. Cl.
CPC .......... *H01M 4/364* (2013.01); *H01M 4/505* (2013.01); *H01M 4/525* (2013.01); *H01M 4/5825* (2013.01); *H01M 10/0525* (2013.01); *H01M 10/425* (2013.01); *H01M 10/482* (2013.01); *H01M 2004/028* (2013.01); *H01M 2010/4271* (2013.01)

(58) Field of Classification Search
CPC ...... H01M 4/364; H01M 4/505; H01M 4/525; H01M 4/5825; H01M 4/136; H01M 4/131; H01M 10/0525; H01M 10/425; H01M 10/482; H01M 10/052; H01M 2004/028; H01M 2010/4271; Y02E 60/10
See application file for complete search history.

(56) References Cited

U.S. PATENT DOCUMENTS 6,964,827 B2 11/2005 Barker et al.
2007/0134554 A1\* 6/2007 Armand ................ H01M 4/136
429/231.95

(Continued)

FOREIGN PATENT DOCUMENTS

CN 102079518 A 6/2011
CN 107146877 A \* 9/2017 ........ H01M 10/0525

(Continued)

OTHER PUBLICATIONS

Machine English translation of CN-107146877-A (Year: 2017).\*

*Primary Examiner* — Scott J. Chmielecki
(74) *Attorney, Agent, or Firm* — Sughrue Mion, PLLC

(57) ABSTRACT

The present disclosure relates to blended cathode materials for use as a positive electrode material of a rechargeable electrochemical cell (or secondary cell) (such as a lithium-ion secondary battery) and also relates to a secondary battery including a cathode having the blended cathode materials. In particular, disclosed are blends of lithium vanadium fluorophosphate (LVPF) or a derivative thereof with one or more conventional cathode active materials in certain weight ratios thereof.

15 Claims, 3 Drawing Sheets
(3 of 3 Drawing Sheet(s) Filed in Color)

(56) References Cited

U.S. PATENT DOCUMENTS

| | | | | |
|---|---|---|---|---|
| 2012/0115024 A1* | 5/2012 | Chen | ............... | H01M 10/4235 |
| | | | | 429/185 |
| 2012/0279850 A1* | 11/2012 | Patoux | ............... | C04B 35/645 |
| | | | | 204/164 |
| 2017/0244255 A1* | 8/2017 | Luo | ............... | H02J 7/007182 |
| 2017/0324084 A1* | 11/2017 | Lee | ............... | H01M 4/1391 |
| 2018/0198125 A1* | 7/2018 | Chang | ............... | H01M 4/131 |
| 2018/0248159 A1* | 8/2018 | Kim | ............... | H01M 10/613 |
| 2021/0234190 A1* | 7/2021 | Komatsubara | ............... | H01M 4/622 |

FOREIGN PATENT DOCUMENTS

| | | | |
|---|---|---|---|
| CN | 108666558 A | 10/2018 | |
| EP | 3369122 A1 | 9/2018 | |
| WO | WO 201187588 A2 | 7/2011 | |

\* cited by examiner

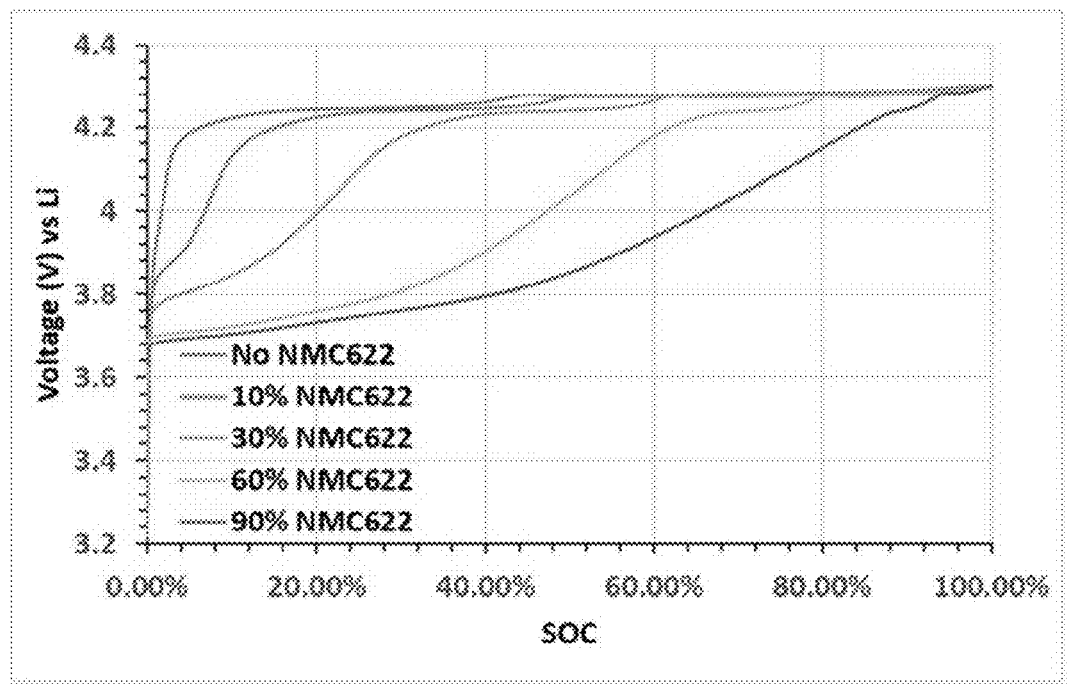
FIG. 1 – Voltage vs. SOC : Charging (LVPF and its blend with NMC)
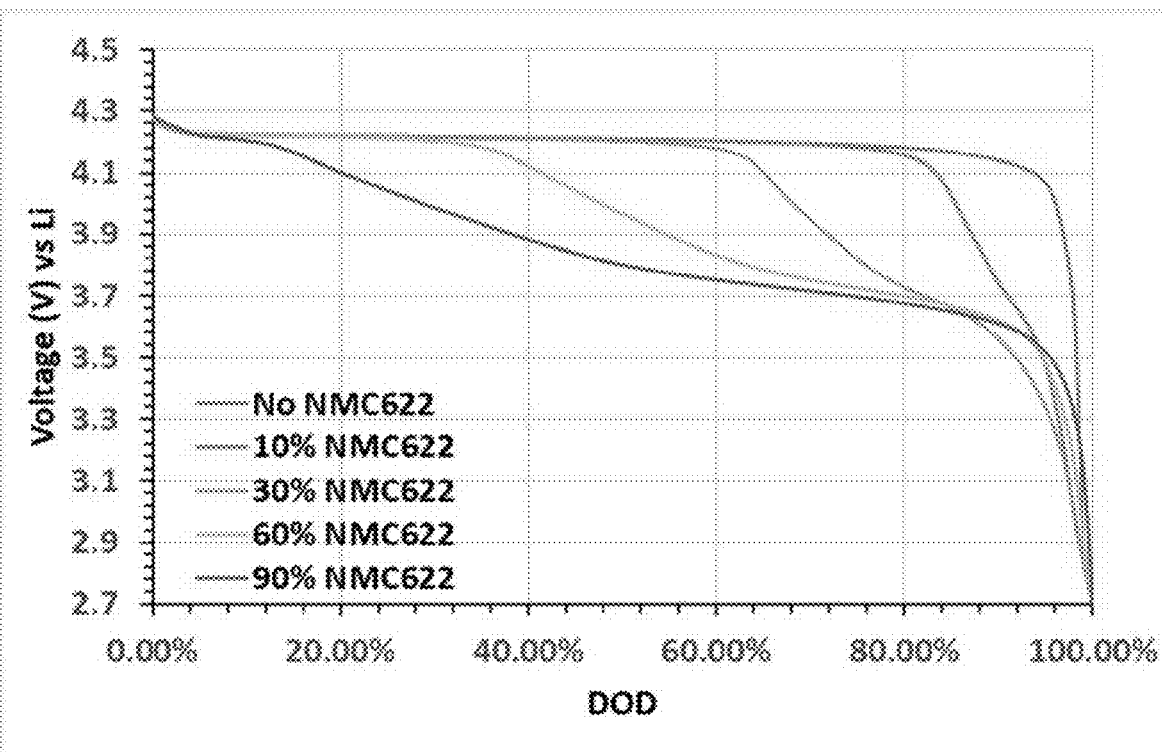
FIG. 2 – Voltage vs. DOD : Discharging (LVPF and its blend with NMC)

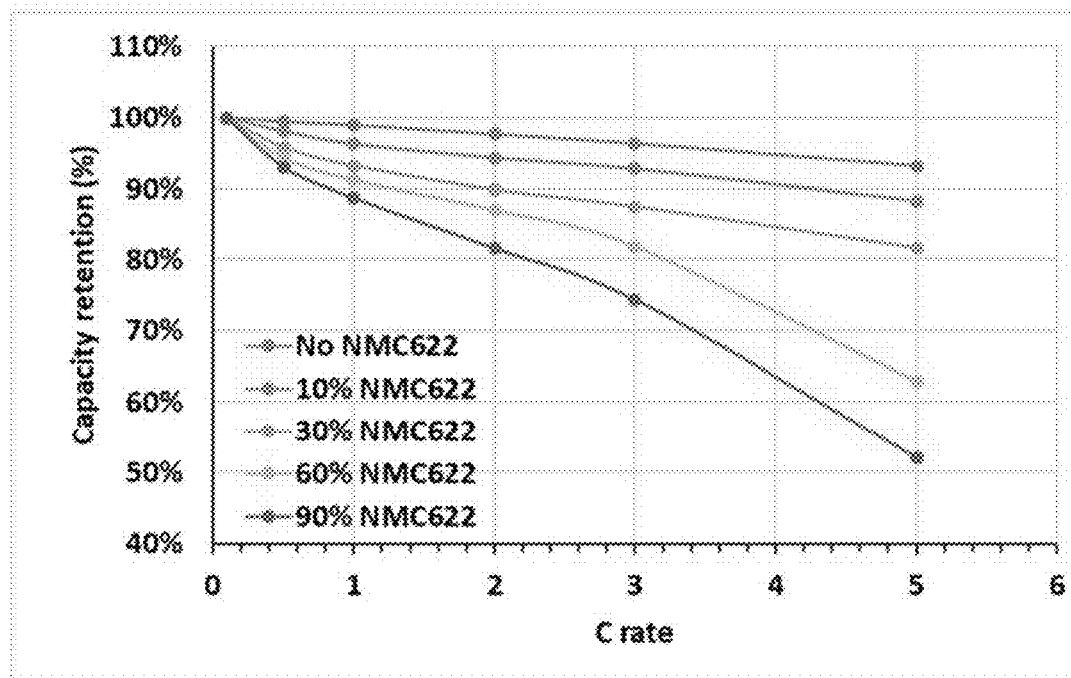
FIG. 3 – Capacity retention vs C rate (LVPF and its blend with NMC)
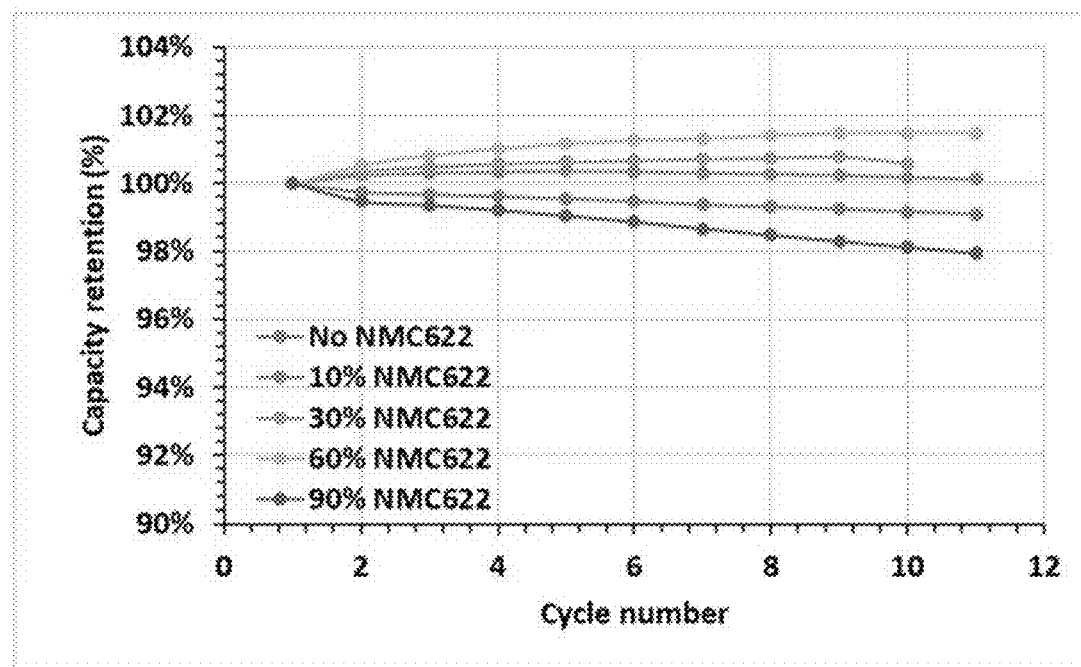
FIG. 4—Capacity retention vs Cycle number (LVPF and its blend with NMC)

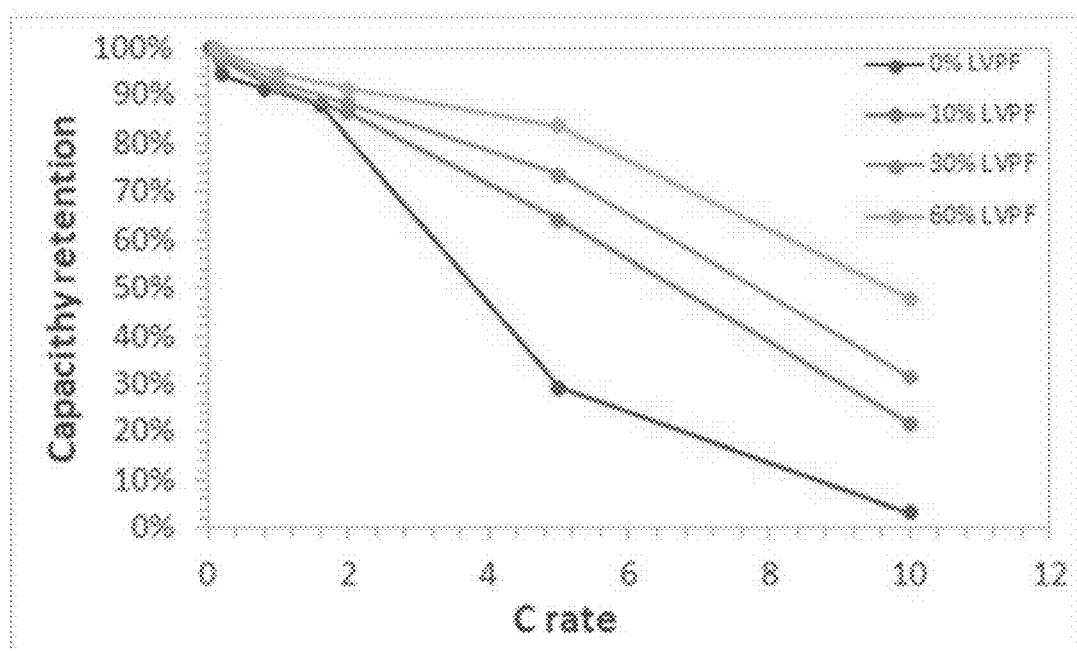
FIG. 5—Capacity retention vs C rate (LFMP and its blend with LVPF)

BLENDED CATHODE MATERIALS FOR SECONDARY BATTERIES

BACKGROUND

Technical Field

The present disclosure relates to blended cathode materials intended to be used in the positive electrode material (or cathode material) of a rechargeable electrochemical cell (or secondary cell) (such as a lithium-ion secondary battery) and also relates to a secondary battery including a cathode having the blended cathode materials. In particular, the present disclosure is directed to blended cathode materials that provide one or more benefits, such as improved determination of state of charge (SOC), energy density, cycle life, coating quality, adhesion, safety, and electrode density.

Description of Related Art

In a secondary cell, an active material is a material which participates in the electrochemical reactions to produce electrical energy when the secondary cell is discharging.

Many materials for use as the cathode active material of a secondary cell are conventionally known, such as NCA, NMC, LFP, LMP, LFMP, LCP, LCO, LNO, LMO, and LNMO (which are described in detail below).

Lithium vanadium fluorophosphate (e.g., LiVPO$_4$F and its derivatives) (LVPF) is a known cathode active material that has a relatively high energy density (compared to many conventionally used cathode materials) from its charge and discharge plateau of about 4.2 V vs. Li$^+$/Li (the V$^{4+}$/V$^{3+}$ redox pair), which, respectively, correspond to the intercalation and deintercalation of lithium ions.

However, it was determined that the use of LVPF as a cathode active material may have certain disadvantages. For example, it was determined that the very flat charge/discharge plateaus of LVPF can make it difficult for a battery management system (or BMS) to monitor the state of charge (or SOC) in order to precisely predict the remaining energy for further utilization.

Accordingly, there is still a need for a cathode active material for a secondary cell that beneficially provides one or more of high energy density, high cycling life, improved rate capability, and improved ease of use with a BMS.

SUMMARY OF THE DISCLOSURE

Aspects of certain embodiments of the present disclosure overcome the above disadvantages and/or other disadvantages not described above. However, aspects of the embodiments are not required to overcome the disadvantages described above, and aspects of the embodiments may not overcome any of the disadvantages described above.

The embodiments of the present disclosure are directed to blended cathode materials including a lithium vanadium fluorophosphate.

More specifically, the blended cathode materials according to the present disclosure include a blend of a first active material, which is lithium vanadium fluorophosphate (LVPF) or a derivative thereof, with a second active material (the second active material being a conventionally used cathode active material other than LVPF). The second active material and/or an amount thereof can be selected for the purpose of generating a voltage slope at the beginning of charge and end of discharge. The first active material (LVPF or a derivative thereof) can also be blended with a second active material for the purpose of achieving one or more of a higher energy density, an improved cycling life, and/or an improved rate capacity. Alternatively, the first active material (LVPF or a derivative thereof) can be added to the second active material to improve processability of the second active material (e.g., LFMP).

According to one embodiment, the present disclosure provides a positive electrode active material for use in a secondary battery, the positive electrode active material including:

a first active material selected from a lithium vanadium fluorophosphate (LVPF) represented by the following Formula (1) or a LVPF derivative represented by the following Formula (2):

$$Li_{1+x}VPO_4F \qquad \text{Formula (1)},$$

wherein, in Formula (1), 0≤x≤0.15, $$Li_{1+x}V_{1-y}M_yPO_4F_z \qquad \text{Formula (2)},$$

wherein, in Formula (2), 0≤x≤0.15, 0<y≤0.5, 0.8≤z≤1.2, and M is selected from Ti, Al, Y, Cr, Cu, Mg, Mn, Fe, Co, Ni, or Zr; and a second active material, wherein a weight ratio of the first active material to the second active material is r:(1−r), wherein 0<r<1; and the second active material is represented by one of the following Formulas (A) to (D) or a blend thereof:

$$Li_{1+x}M1_aX_bPO_4 \qquad \text{Formula (A)},$$

wherein, in Formula (A), M1 is at least one selected from Fe, Mn or Co; X is at least one transition metal selected from Ni, V, Y, Mg, Ca, Ba, Al, Sc or Nd; 0≤x≤0.15; a>0; b≥0; and optionally a+b=1;

$$Li_{1+x}Ni_aM2_dM3_eO_2 \qquad \text{Formula (B)},$$

wherein, in Formula (B), M2 is at least one selected from Co, Al, or Mn; M3 is at least one of B, Mg, Si, Ca, Ti, V, Cr, Mn, Fe, Cu, Zn, Y, Zr, Nb, W, Mo, Sr, Ce, Ga, Ta, or mixtures thereof; 0≤x≤0.15; a>0; d>0; e≥0; and optionally a+d+e=1;

$$Li_{1+x}Mn_2O_4 \qquad \text{Formula (C)},$$

wherein, in Formula (C), 0≤x≤0.15;

$$Li_{1+x}CoO_2 \qquad \text{Formula (D)},$$

wherein, in Formula (D), 0≤x≤0.15.

Herein, the general use of the term "LVPF" alone and the term "LVPF or derivatives" both mean the combination of LVPF according to Formula (1) and LVPF derivatives according to Formula (2). Further, the general use of the term "LMO" refers to the Formula (C), and the general use of the term "LCO" refers to Formula (D).

In any one of the aspects of the present disclosure, with regard to the weight ratio (r:(1−r)) of the blend of the first active material to the second active material, the value r corresponding to the weight of the first active material can be any value greater than 0 and less than 1. For example, in certain embodiments, the value for r can be 0.1≤r≤0.9, 0.2≤r≤0.9, 0.3≤r≤0.9, 0.4≤r≤0.9, 0.5≤r≤0.9, 0.6≤r≤0.9, 0.7≤r≤0.9, 0.8≤r≤0.9.

In one aspect of the present disclosure, the second active material is represented by a well-known cathode active material selected from LFP, LMP, LCP, (optionally doped) LFMP, NMC, LNMO, NCA, NMCA, LMO, or LCO or a blend thereof.

In one aspect of the present disclosure, the second active material is represented by one of the following Formula (A1) to (A4) or a blend thereof:

$$Li_{1+x}FePO_4 \quad \text{Formula (A1)},$$

wherein, in Formula (A1), $0 \leq x \leq 0.15$;

$$Li_{1+x}MnPO_4 \quad \text{Formula (A2)},$$

wherein, in Formula (A2), $0 \leq x \leq 0.15$;

$$Li_{1+x}CoPO_4 \quad \text{Formula (A3)},$$

wherein, in Formula (A3), $0 \leq x \leq 0.15$;

$$Li_{1+x}Fe_yMn_zX_bPO_4 \quad \text{Formula (A4)},$$

wherein, in Formula (A4), X is at least one transition metal selected from Ni, V, Y, Mg, Ca, Ba, Al, Sc, or Nd; $0 \leq x \leq 0.15$; $y > 0$; $z > 0$; $b \geq 0$; and optionally $y+z+b=1$.

Herein, the general term "LFP" refers to Formula (A1), the general term "LMP" refers to Formula (A2), the general term "LCP" refers to Formula (A3), and the general terms "optionally-doped LFMP" or "LFMP" refer to Formula (A4).

In one aspect of the present disclosure, the second active material is represented by one of the following Formula (B1) to (B4) or a blend thereof:

$$Li_w(Ni_xMn_yCo_zM_t)O_2 \quad \text{Formula (B1)},$$

wherein, in Formula (B1), $0.9 \leq w \leq 1.1$; $x > 0$; $y > 0$; $z > 0$; $t \geq 0$; M is at least one of Al, B, Mg, Si, Ca, Ti, V, Cr, Fe, Cu, Zn, Y, Zr, Nb, W, Mo, Sr, Ce, Ga, Ta, or mixtures thereof, and optionally $x+y+z+t=1$, $$Li_{1+x}Ni_aMn_bO_2 \quad \text{Formula (B2)},$$

wherein, in Formula (B2), $0 \leq x \leq 0.15$; $a > 0$; $b > 0$; and $a+b=1$, $$Li_w(Ni_xCo_yAl_zM_t)O_2 \quad \text{Formula (B3)},$$

wherein, in Formula (B3), $0.9 \leq w \leq 1.1$; $x > 0$; $y > 0$; $z > 0$; $t \geq 0$; M is at least one of B, Mg, Si, Ca, Ti, V, Cr, Mn, Fe, Cu, Zn, Y, Zr, Nb, W, Mo, Sr, Ce, Ga, Ta, or mixtures thereof, and optionally $x+y+z+t=1$, $$Li_{1+x}Ni_aMn_bCo_cAl_dO_2 \quad \text{Formula (B4)},$$

wherein, in Formula (B4), $0 \leq x \leq 0.15$; $a > 0$; $b > 0$; $c > 0$; $d > 0$; and optionally $a+b+c+d=1$.

Herein, the general term "NMC" refers to the Formula (B1), the general term "LNMO" refers to the Formula (B2), the general term "NCA" refers to the Formula (B3), and the general term "NMCA" refers to the Formula (B4).

In some aspects of the disclosure, the second active material represented by the Formula (B1) (NMC) is represented by the following Formula (B1'):

$$Li_w(Ni_xMn_yCo_z)O_2 \quad \text{Formula (B1')},$$

wherein, in Formula (B1'), $0.9 \leq w \leq 1.1$; $x > 0$; $y > 0$; $z > 0$; and optionally $x+y+z=1$.

In one aspect of the present disclosure, the second active material represented by the Formula (B1) is selected from $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, or $LiNi_{0.8}Mn_{0.1}Co_{0.1}O_2$.

In some aspects of the disclosure, the second active material represented by the Formula (B3) (NCA) is represented by the following Formula (B3'):

$$Li_w(Ni_xCo_yAl_z)O_2 \quad \text{Formula (B3')},$$

wherein, in Formula (B3), $0.9 \leq w \leq 1.1$; $x > 0$; $y > 0$; $z > 0$; and optionally $x+y+z=1$.

In one aspect of the present disclosure, the second active material is represented by a blend of the Formula (A) with the Formula (B).

In one aspect of the present disclosure, the second active material is represented by a blend of the following Formula (A4) with the following Formula (B1):

$$Li_{1+x}Fe_yMn_zX_bPO_4 \quad \text{Formula (A4)},$$

wherein, in the Formula (A4), X is at least one transition metal selected from Ni, V, Y, Mg, Ca, Ba, Al, Sc or Nd; $0 \leq x \leq 0.15$; $y > 0$; $z > 0$; $b \geq 0$; and optionally $y+z+b=1$, $$Li_w(Ni_xMn_yCo_zM_t)O_2 \quad \text{Formula (B1)},$$

wherein, in the Formula (B1), $0.9 \leq w \leq 1.1$; $x > 0$; $y > 0$; $z > 0$; $t \geq 0$; M is at least one of Al, B, Mg, Si, Ca, Ti, V, Cr, Fe, Cu, Zn, Y, Zr, Nb, W, Mo, Sr, Ce, Ga, Ta, or mixtures thereof, and optionally $x+y+z+t=1$.

In one aspect of the present disclosure, a weight ratio of the Formula (A4) to the Formula (B1) is m:(1−m), wherein $0 < m < 1$.

In one aspect of the present disclosure, the second active material is represented by a blend of the following Formula (A4) with the following Formula (B3):

$$Li_{1+x}Fe_yMn_zX_bPO_4 \quad \text{Formula (A4)},$$

wherein, in the Formula (A4), X is at least one transition metal selected from Ni, V, Y, Mg, Ca, Ba, Al, Sc or Nd; $0 \leq x \leq 0.15$; $y > 0$; $z > 0$; $b \geq 0$; and optionally $y+z+b=1$;

$$Li_w(Ni_xCo_yAl_zM_t)O_2 \quad \text{Formula (B3)};$$

wherein, in Formula (B3), $0.9 \leq w \leq 1.1$; $x > 0$; $y > 0$; $z > 0$; $t \geq 0$; M is at least one of B, Mg, Si, Ca, Ti, V, Cr, Mn, Fe, Cu, Zn, Y, Zr, Nb, W, Mo, Sr, Ce, Ga, Ta, or mixtures thereof, and optionally $x+y+z+t=1$.

In one aspect of the present disclosure, a weight ratio of the Formula (A4) to the Formula (B3) is m:(1−m), wherein $0 < m < 1$.

In one aspect, Formula (A4) (corresponding to optionally-doped LFMP) can be blended with Formula (B1) (NMC), wherein a weight ratio of Formula (A4) to Formula (B1) is a:(1−a), where the value a is any value greater than 0 and less than 1 (i.e., $0 < a < 1$). For example, the value a can be $0.1 \leq a \leq 0.9$, $0.2 \leq a \leq 0.8$, $0.3 \leq a \leq 0.7$, or $0.4 \leq a \leq 0.6$.

In another aspect, Formula (A4) (optionally-doped LFMP) can be blended with Formula (B3) (NCA), wherein a weight ratio of Formula (A4) to Formula (B3) is b:(1−b), where the value b is any value greater than 0 and less than 1 (i.e., $0 < b < 1$). For example, the value b can be $0.1 \leq b \leq 0.9$, $0.2 \leq b \leq 0.8$, $0.3 \leq b \leq 0.7$, or $0.4 \leq b \leq 0.6$.

In another aspect, 20 wt. % to 40 wt. % of LVPF ($0.2 \leq r \leq 0.4$) is blended with a non-phosphate cathode material (such as NMC, NCA, LCO, LNMO, etc.) for the benefit of improved safety, without significantly sacrificing the energy density.

In one aspect of the present disclosure, the positive electrode material includes a binder material and/or a conductive material.

In another embodiment, the present disclosure provides a secondary battery using one of the cathode material blends according to the present disclosure.

In one aspect, the secondary battery is a lithium-ion secondary battery.

In one aspect, the secondary battery includes at least a cathode including the positive electrode material according to the present disclosure; an anode including a negative electrode active material; and an electrolytic solution including a supporting salt and an organic solvent. When the battery is a lithium-ion secondary battery, the supporting salt can be a well-known lithium salt.

In another embodiment, the present disclosure provides a battery system that includes a plurality of electrically connected secondary batteries according the present disclosure.

In one aspect, the battery system includes a plurality of secondary batteries according the present disclosure, the plurality of batteries being electrically connected; and a battery management system configured to monitor a state of charge of the plurality of batteries based on a voltage of one or more battery of the plurality of batteries.

In one aspect, the blended cathode material of one or more of the plurality of batteries of the battery system is selected for generating a voltage slope generated at the beginning of charge and end of discharge.

Additional features and advantages of the present disclosure are described further below. This summary section is meant merely to illustrate certain features of the disclosure, and is not meant to limit the scope of the disclosure in any way. The failure to discuss a specific feature or embodiment of the disclosure, or the inclusion of one or more features in this summary section, should not be construed to limit the claims.

BRIEF DESCRIPTION OF THE FIGURES

The application file contains at least one drawing executed in color. Copies of this patent application publication with color drawing(s) will be provided by the Office upon request and payment of the necessary fee.

Any figures contained herein are provided only by way of example and not by way of limitation.

FIG. 1 is a chart showing voltage (V) (vs. Li) vs SOC during charging for the cells prepared in Example 1.

FIG. 2 is a chart showing voltage (V) (vs. Li) vs DOD during discharging for the cells prepared in Example 1.

FIG. 3 is a chart showing rate capability (capacity retention (%) vs C rate) for the cells prepared in Example 1.

FIG. 4 is a chart showing capacity retention (%) vs cycle number for the cells prepared in Example 1.

FIG. 5 is a chart showing capacity retention (%) vs C rate for the cells prepared in Example 2.

DETAILED DESCRIPTION OF THE EMBODIMENTS OF THE DISCLOSURE

It is to be understood that both the foregoing general description and the following detailed description are exemplary and are intended to provide further explanation of the claims. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Any range will be understood to encompass and be a disclosure of each discrete point and subrange within the range.

Unless defined otherwise, all technical and scientific terms used herein have the same meaning as commonly understood by one of ordinary skill in the art to which this disclosure belongs. Any methods and materials similar or equivalent to those described herein may be used in the practice or testing of the disclosure, as it will be understood that modifications and variations are encompassed within the spirit and scope of the instant disclosure.

As used herein, "about," "approximately," "substantially," and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term, and "substantially" and "significantly" will mean plus or minus >10% of the particular term. "Comprising" and "consisting essentially of" have their customary meaning in the art.

The blended cathode materials of the disclosure include a blend of a first active material, which is lithium vanadium fluorophosphate (LVPF) or derivative thereof, with a second active material, which is a conventional cathode active material other than LVPF.

LVPF—The First Active Material

The first active material is selected from a lithium vanadium fluorophosphate (LVPF) represented by the following Formula (1) or a LVPF derivative represented by the following Formula (2):

$$Li_{1+x}VPO_4F \quad \text{Formula (1)},$$

wherein, in Formula (1), $0 \leq x \leq 0.15$,

$$Li_{1+x}V_{1-y}M_yPO_4F_z \quad \text{Formula (2)},$$

wherein, in Formula (2), $0 \leq x \leq 0.15$, $0 < y \leq 0.5$, $0.8 \leq z \leq 1.2$, and M is selected from Ti, Al, Cu, Mg, Mn, Fe, Co, Y, Cr, Ni, or Zr.

In some embodiments, the first active material can be a blend of Formula (1) and Formula (2). When both LVPF and a LVPF derivative are used, the weight ratio of Formula (1) to Formula (2) can be s:(1−s), wherein 0<s<1. In some embodiments, the value for s can be, for example, $0.1 \leq s \leq 0.9$, $0.2 \leq s \leq 0.8$, $0.3 \leq s \leq 0.7$, or $0.4 \leq s \leq 0.6$.

Among LVPF derivatives according to Formula (2), $LiY_xV_{1-x}PO_4F$ (0<x≤0.5), $LiCr_xV_{1-x}PO_4F$ (0<x≤0.5), $LiCo_xV_{1-x}PO_4F$ (0<x≤0.5), $LiMn_xV_{1-x}PO_4F$ (0<x≤0.5), $LiTi_xV_{1-x}PO_4F$ (0<x≤0.5), $LiFe_xV_{1-x}PO_4F$ (0<x≤0.5) are thought to be particularly preferred.

The Second Active Material

The second active material can be any known cathode active material other than LVPF. In some embodiments, the second active material is one of the following well-known materials NCA, NMC, LFP, LMP, optionally-doped LFMP, LCP, LCO, LNO, LMO, or LNMO or a blend thereof. The second active material can be generally represented by one or more of the following formulae (A) to (D).

Formula (A) (e.g., LFP, LMP, LCP, and Optionally-Doped LFMP)

The second active material can be represented by the following Formula (A):

$$Li_{1+x}M1_aX_bPO_4 \quad \text{Formula (A)},$$

wherein, in Formula (A), M1 is at least one selected from Fe, Mn or Co; X is at least one transition metal selected from Ni, V, Y, Mg, Ca, Ba, Al, Sc, or Nd; 0≤x≤0.15; a>0; b≥0; and optionally a+b=1.

More specifically, the second active material according to the Formula (A) can be one of the following Formula (A1) (i.e., LFP), Formula (A2) (i.e., LMP), Formula (A3) (i.e., LCP) or Formula (A4) (i.e., optionally-doped LFMP) or a blend thereof:

$$Li_{1+x}FePO_4 \quad \text{Formula (A1),}$$

wherein, in Formula (A1), 0≤x≤0.15;

$$Li_{1+x}MnPO_4 \quad \text{Formula (A2),}$$

wherein, in Formula (A2), 0≤x≤0.15;

$$Li_{1+x}CoPO_4 \quad \text{Formula (A3),}$$

wherein, in Formula (A3), 0≤x≤0.15;

$$Li_{1+x}Fe_yMn_zX_bPO_4 \quad \text{Formula (A4),}$$

wherein, in Formula (A4), X is at least one transition metal selected from Ni, V, Y, Mg, Ca, Ba, Al, Sc, or Nd; 0≤x≤0.15; y>0; z>0; b≥0; and optionally y+z+b=1.

As noted above, the general term "LFP" means Formula (A1), the general term "LMP" means Formula (A2), the general term "LCP" means Formula (A3), and the general terms "optionally-doped LFMP" or "LFMP" alone mean Formula (A4).

Formula (B) (e.g., NMC, LNMO, NCA, and NMCA)

The second active material can be represented by the following Formula (B):

$$Li_{1+x}Ni_aM2_dM3_eO_2 \quad \text{Formula (B),}$$

wherein, in Formula (B), M2 is at least one selected from Co, Al or Mn; M3 is at least one of B, Mg, Si, Ca, Ti, V, Cr, Mn, Fe, Cu, Zn, Y, Zr, Nb, W, Mo, Sr, Ce, Ga, Ta, or mixtures thereof; 0≤x≤0.15; a>0; d>0; e≥0; and optionally a+d+e=1.

More specifically, the second active material according to the Formula (A) can be one of the following Formula (B1) to (B4):

$$Li_w(Ni_xMn_yCo_zM_t)O_2 \quad \text{Formula (B1),}$$

wherein, in Formula (B1), 0.9≤w≤1.1; x>0; y>0; z>0; t≥0; M is at least one of Al, B, Mg, Si, Ca, Ti, V, Cr, Fe, Cu, Zn, Y, Zr, Nb, W, Mo, Sr, Ce, Ga, Ta, or mixtures thereof; and optionally x+y+z+t=1;

$$Li_{1+x}Ni_aMn_bO_2 \quad \text{Formula (B2),}$$

wherein, in Formula (B2), 0≤x≤0.15; a>0; b>0; and optionally a+b=1;

$$Li_w(Ni_xCo_yAl_zM_t)O_2 \quad \text{Formula (B3),}$$

wherein, in Formula (B3), 0.9≤w≤1.1; x>0; y>0; z>0; t≥0; M is at least one of B, Mg, Si, Ca, Ti, V, Cr, Mn, Fe, Cu, Zn, Y, Zr, Nb, W, Mo, Sr, Ce, Ga, Ta, or mixtures thereof, and optionally x+y+z+t=1;

$$Li_{1+x}Ni_aMn_bCo_cAl_dO_2 \quad \text{Formula (B4),}$$

wherein, in Formula (B4), 0≤x≤0.15; a>0; b>0; c>0; d>0; and optionally a+b+c+d=1.

Specific examples of Formula (B) include, for example, NMC (see Formula B1), LNMO (see Formula B2), NCA (see Formula B3), and NMCA (see Formula B4).

As noted above, the general term "NMC" means Formula (B1), the general term "LNMO" means Formula (B2), the general term "NCA" means Formula (B3), and the general term "NMCA" mean Formula (B4).

Specific examples of Formula (B1) include, for example, $LiNi_{0.33}Mn_{0.33}Co_{0.33}O_2$ (NMC 111), $LiNi_{0.5}Mn_{0.3}Co_{0.2}O_2$ (NMC 532), $LiNi_{0.6}Mn_{0.2}Co_{0.2}O_2$ (NMC 622), or $LiNi_{0.8}Mn_{0.1}Co_{0.1}O_2$ (NMC 811).

Formula (C) (LMO)

The second active material can be represented by the following Formula (C):

$$Li_{1+x}Mn_2O_4 \quad \text{Formula (C),}$$

wherein, in Formula (C), 0≤x≤0.15.

As noted above, the general term "LMO" means Formula (C).

Formula (D) (LCO)

The second active material can be represented by the following Formula (D):

$$Li_{1+x}CoO_2 \quad \text{Formula (D),}$$

wherein, in Formula (D), 0≤x≤0.15.

As noted above, the general term "LCO" means Formula (D).

Example Blends and Amounts

As noted above, the weight ratio of the first active material (i.e., LVPF or derivative) to the second active material is r:(1−r), wherein 0≤r≤1. In other words, the term "r" corresponds to the weight percent of the first active material when a total of the first active material and second active material is considered to be 100%. For example, when r is 0.9, this corresponds to 90 wt. % first active material and 10 wt. % of the second active material.

In the weight ratio r:(1−r), r can be any value greater than 0 and less than 1, and r is not required to be an integer (e.g., r can be 0.75 to 0.85). In certain embodiments, the value for r can be, for example, 0.1≤r≤0.9, 0.2≤r≤0.9, 0.3≤r≤0.9, 0.4≤r≤0.9, 0.5≤r≤0.9, 0.6≤r≤0.9, 0.7≤r≤0.9, 0.8≤r≤0.9, etc.

The following example blended cathode materials of the first active material with a blend of the second active material are specifically mentioned.

In one example embodiment, the first active material (LVPF) is blended with Formula (A4) (LFMP) as the second active material in the weight ratio r:(1−r) in order to generate a sloped discharge curve to facilitate determining SOC. For example, the second plateau (~3.5V) of the LFMP can serve as an excellent SOC indicator in discharge. In this embodiment, r is not particularly limited. However, in certain aspects, r is preferably 0.4≤r≤0.6.

In a modification of this example embodiment, Formula (A4) (LFMP) can be blended with Formula (B1) (NMC) as the second active material, wherein a weight ratio of LFMP to NMC in this blend is a:(1−a) (i.e., $LVPF_r(LMFP_a NMC_{1-a})_{1-r}$), where the value a is any value greater than 0 and less than 1 (i.e., 0<a<1). For example, the value a can be 0.1≤a≤0.9, 0.2≤a≤0.8, 0.3≤a≤0.7, or 0.4≤a≤0.6.

In another modification of this example embodiment, Formula (A4) (LFMP) can be blended with Formula (B3) (NCA) as the second active material, wherein a weight ratio of LFMP to NCA in this blend is b:(1−b) (i.e., $LVPF_r(LMFP_b NCA_{1-b})_{1-r}$), where the value b is any value greater than 0 and less than 1 (i.e., 0<b<1). For example, the value b can be 0.1≤b≤0.9, 0.2≤b≤0.8, 0.3≤b≤0.7, or 0.4≤b≤0.6.

In another example embodiment, the first active material (LVPF) is blended with Formula (B1) (NMC (e.g., NMC111, NMC532, NMC622, NMC811, etc.)) as the second active material in the weight ratio r:(1−r). In this example embodiment, the value for r is preferably 0.4≤r≤0.6.

In another example embodiment, the first active material (LVPF) is blended with Formula (B3) (NCA) as the second active material in the weight ratio r:(1−r). In this example embodiment, r is preferably 0.4≤r≤0.6.

In another example embodiment, LVPF is added to Formula (A4) (LFMP) as the second active material in the weight ratio r:(1−r) for the purpose of improving one or both of the capacity retention and processability of the LFMP. In this example embodiment, r may be 0.1≤r≤0.6. In this example embodiment, the second active material may include another of the second active materials in combination with the LFMP as follows: $LVPF_x(LFMP_aZ_b)_y$, wherein a+b=1, 0<a≤1, 0≤b<1, x+y=1; 0<x<1, 0<y<1, and "Z" is any one of the other second active materials disclosed herein (e.g., NCA, LCO, LNO, LMO, etc.).

In another example embodiment, it has also been found that blending LVPF into non-phosphate cathode materials (such as NMC, NCA, LCO, LNMO, etc.) can improve the safety of the cells. For example, without being bound by any theory, blending the LVPF can suppress oxygen release from the non-phosphate cathode materials during cycling, lower the exothermic heat during thermal run away or abusing situation and/or raise the decomposition temperature, etc. The blended cathode material has been found to start to show these safety benefits by adding 10 wt. % of LVPF (i.e., r=0.1) into cathode material blend, and the benefit has been shown to become significant by adding 20 wt. % or more of LVPF. Overall, it has been found that increasing the amount of LVPF in the blended cathode materials provides a correspondingly increasing improvement in safety. On the other hand, increasing the amount of LVPF might reduce energy density, since, for example, the energy density of LVPF is lower than some NMC cathode materials, such as NMC811. Accordingly, in this example embodiment, a blended cathode material is particularly disclosed in which 20 wt. % to 40 wt. % of LVPF (0.2≤r≤0.4) is blended with a non-phosphate cathode material (such as NMC, NCA, LCO, LNMO, etc.) for the benefit of improved safety, without significantly sacrificing the energy density.

Secondary Battery

The present disclosure also provides a secondary battery including a cathode having the positive electrode active material (blended cathode materials) of the present disclosure, an anode, and an electrolytic solution. A separator can be disposed between the anode and the cathode.

The individual electrochemical cells of the present disclosure can be of any known type, such as cylindrical cell, button cell, prismatic cell, and pouch.

Cathode

The structure of the cathode is not particularly limited, except that the cathode includes at least the positive electrode active material (blended cathode materials) of the present disclosure on a current collector. The cathode material can also include one or more binder materials and one or more conductive materials.

The current collector is not particularly limited and known materials and designs can be used. In a preferred embodiment, the current collector is a two-dimensional conducting support such as a solid or perforated sheet, based on carbon or metal, for example aluminum, nickel, steel, stainless steel, or carbon coated aluminum.

The binder material is not particularly limited and known materials for this function can be used. For example, the binder material may contain one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methylacrylic acid, acrylamide, itaconic acid, sulfonic acid, and their derivatives with lithium salt elastomers and cellulose compounds.

Among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethylene/butylene/styrene copolymers (SEBS), styrene/butadiene/vinylpyridine terpolymers (SBVR), polyurethanes (PU), neoprenes, polyisobutylenes (PIB), butyl rubbers and mixtures thereof.

The cellulose compound may be, for example, a carboxymethylcellulose (CMC), a hydroxypropylmethylcellulose (HPMC), a hydroxypropylcellulose (HPC), a hydroxyethylcellulose (HEC) or other cellulose derivative.

The conductive material is not particularly limited and any known conductive material can be used. For example, the conductive material can be selected from graphite, carbon black, acetylene black (AB), carbon nanotubes (CNT), carbon fiber (CF), soot or one of their mixtures.

Methods of making cathodes are well known. For example, the cathode material can be combined with a binder material and/or a conductive material and applied to a current collector by a known method. For example, granules including the cathode material could be formed and pressed to the current collector by a known method, or a slurry including the cathode material and a solvent could be coated on the current collector and then dried by a known method.

The amounts of a binder, conductive material, and other additives are not particularly limited, and suitable ratios are well known in the art. The amount of the conductive material is preferably 1 wt % to 20 wt % (or any amount within this range, e.g., 4 wt % to 18 wt %), and the amount of the binder is preferably 1 wt % to 20 wt % (or any amount within this range, e.g., 1 wt % to 7 wt %), when a total weight of the positive electrode material is considered 100 wt %.

Anode

The structure of the negative electrode (or anode) is not particularly limited and known anode active materials can be used, as long as the material can function as the negative electrode active material of the lithium-ion battery. For example, the active material of the anode can include carbon-based negative electrode active materials, such as graphite and coke, alloy-based negative electrode active materials such as Si and/or Sn, SiOx, a lithium metal, a lithium titanate oxide (LTO), or a blend thereof. The anode active material can include particles of one these materials coated with a layer of conductive carbon (e.g., graphitic carbon) (e.g., particles of SiOx coated with carbon).

Similar to the cathode, the anode material can include the anode active material and a binder, and the anode material can be applied to a current collector. In a preferred embodiment, the anode active material of the present disclosure can account for 50 wt % to 99 wt % of the anode material (or any amount within this range, e.g., 95 wt % to 99 wt %, or 97 wt % to 99 wt %) of the anode material.

Electrolytic Solution

The electrolytic solution can be a known non-aqueous electrolytic solution, which includes a supporting salt (e.g., a lithium salt) dissolved in a solvent.

The lithium salt is not particularly limited and known lithium salts for use in non-aqueous lithium-ion batteries can be used. In preferred embodiments, the electrolyte salt may include one or more of lithium bis(fluorosulfonyl)imide ("LiFSI"), lithium bis(trifluoromethanesulfonyl)imide ("LiTFSI"), LiBF$_4$, lithium bis(oxalato)borate ("LiBOB"), LiClO$_4$, LiAsF$_6$, LiPF$_6$, LiCF$_3$SO$_3$, LiAlCl$_4$, lithium 4,5-dicyano-2-(trifluoromethyl)imidazole ("LiTDI"), LiPO$_2$F$_2$, and the like.

In preferred embodiments, the lithium salt concentration in the electrolytic solution is more than 0.8M, more than 1.0M, more than 1.2M, more than 1.4M, more than 1.5M, more than 1.6M, more than 1.7M, more than 1.8M, or more than 2.0M. In preferred embodiments, the salt concentration is less than 4.0M, less than 3.6M, less than 3.2M, less than 2.8M, less than 2.4M, less than 2.0M, less than 1.6M, or less than 1.2M.

The solvent is not particularly limited and known solvents for non-aqueous lithium-ion batteries can be used. The solvent can be a single solvent or a mixture of a plurality solvents. The solvent can be selected from usual organic solvents, notably saturated cyclic carbonates, unsaturated cyclic carbonates, non-cyclic (or linear) carbonates, alkyl esters such as formates, acetates, propionates or butyrates, ethers, lactones such as gamma-butyrolactone, tetrahydrothiophene bioxide, nitrile solvents and mixtures thereof. Among such saturated cyclic carbonates, specific mention may be made, for example, of ethylene carbonate (EC), propylene carbonate (PC), butylene carbonate (BC), and mixtures thereof. Among unsaturated cyclic carbonates, specific mention may be made, for example, of vinylene carbonate (VC), its derivatives and mixtures thereof. Among non-cyclic carbonates, specific mention may be made, for example, of dimethyl carbonate (DMC), diethyl carbonate (DEC), ethyl methyl carbonate (EMC), dipropyl carbonate (DPC) and mixtures thereof. Among the alkyl esters, specific mention may be made, for example, of methyl acetate, ethyl acetate, methyl propionate, ethyl propionate, butyl propionate, methyl butyrate, ethyl butyrate, propyl butyrate and mixtures thereof. Among the ethers, mention may for example be made of dimethyl ether (DME) or diethyl ether (DEE), and mixtures thereof. Known fluorinated solvents can also be used, including, for example, fluorinated benzenes (such as hexafluorobenzene, pentafluorobenzene, 1,2,3,4-tetrafluorobenzene, etc.), fluorine substituted linear carbonates, etc.

The electrolytic solution may include a known additive for use in a non-aqueous lithium-ion battery.

One type of additive that may be included in the electrolytic solution is a gas-generation agent used for implementing a pressure-type current interrupt device (CID). Exemplary gas-generation agents include cyclohexylbenzene (CHB), biphenyls, and fluorinated biphenyls having an oxidation potential lower than that of the solvent in the electrolyte solution. When the lithium-ion battery reaches an overcharged state, the compound reacts to generate gas before the electrolyte solution decomposes. When included, the amount of the gas-generation agent is preferably 0.01 wt % to 10 wt % (or any amount within this range, such as, for example, 0.1 wt % to 5 wt %; or 1 wt % to 3 wt %).

Specific mention can also be made to the use of known film-forming additives for forming a solid-electrode interface (SEI) film on the anode or cathode. For example, one such additive includes fluorinated compound additives, such as fluorinated ethylene carbonate (FEC). When included, FEC (and/or another additive) can be added to the solvent in an amount of 0.1 to 20 wt % based on the total weight of the solvent, or can be added in any amount with this range, such as, for example, 1 to 10 wt %, 2 to 9 wt %, 3 to 8 wt %, 4 to 7 wt %, 5 to 6 wt %, 1 to 5 wt %, 1 to 4 wt %, 1 to 3 wt %, 1 to 2 wt %, 2 to 3 wt %, or 0.1 to 1 wt %.

Separator

The use of a separator is not particularly limited and known separators for secondary batteries can be used. Separators are placed between both electrodes, and typically show high ionic conductivity (e.g., allow cations (e.g., Li$^+$) to pass therethrough), mechanical stability, and thermal stability. Separators are also known which stop the growth of a dendrite.

Conventional categories of separators include microporous membranes, nonwoven membranes, electrospun membranes, membranes with external surface modification, composite membranes, and polymer blends. In one embodiment, the separator is a microporous membrane made of a polyolefin-based material, such as, for example, a microporous membrane made of polyethylene (PE), polypropylene (PP) or the like.

In some embodiments, the battery does not contain an electrolytic solution and a separator. Instead, a solid electrolyte layer can be used that meets the function of both the separator and the electrolytic solution (i.e., a solvent-free electrolyte), such as a solid ion-conducting polymer that is in contact with both the negative electrode and the positive electrode. Solid electrolytes rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., Li$^+$, through the electrolyte. In this case, a solid electrolyte layer may be also referred to as a solid electrolyte separator.

The use of a solid electrolyte separator is not particularly limited. Known solid electrolytes include polymer-based materials (e.g., polyethylene oxide (PEO), PEO-based materials (e.g., PEO-PPO, PEO-epichlorohydrin, methyleneoxy-PEO, PEO-PAAM, PEO-PMHS (polymethylhydrogen-siloxane), etc.)), ceramic-based materials, and cellulose based materials.

Battery Module, Pack and System

A battery module according to the present disclosure is a structure containing multiple secondary cells arranged side by side in a common casing; a battery pack is a structure containing a plurality of electrically connected battery modules; and a battery system is a structure containing a plurality of electrically connected cells or battery modules. A battery module or pack may contain one or more control systems (e.g., BMS).

It is well known and understood how to electrically connect secondary cells in series and in parallel. Several techniques are disclosed, for example, in U.S. Publication No. 2019/0123315 (the '315 application) and U.S. Publication No. 2019/0165584 (the '584 application), which are incorporated herein by reference for their disclosure of techniques for assembling a plurality of electrochemical cells and modules. Further, a battery system may comprise additional structure, including a BMS and a cooling system.

State of Charge

It is well known in the art how to determine the state of charge (SOC) of secondary cells based on cell voltage, and battery management systems (BMS) configured to determine SOC based on cell voltage are also well known. Methods of cell monitoring and balancing are also well known in the art. For example, such methods are discussed in U.S. Publication No. 2010/0253277 (the '277 application) and U.S. Publication No. 2015/0115736 (the '736 application), which are incorporated by reference herein for their discussion of cell monitoring and balancing, including hardware and programming for accomplishing this function.

Battery modules and/or battery systems of the present disclosure may include a known BMS, which is configured, for example, with known programing (e.g., algorithms) for determining SOC. Alternatively, battery modules and systems of the present disclosure may be configured to be operated and/or monitored by an external BMS.

EXAMPLES

In the following, although embodiments of the present disclosure are described in further detail by means of Examples, the present disclosure is not limited thereto.

Example 1

In Example 1, single layer pouch cells were prepared having the following configuration. For each cell, the cathode was made by blending LVPF (LiVPO$_4$F) as the first active material with NMC622 (LiNi$_{0.6}$Mn$_{0.2}$Co$_{0.2}$O$_2$) as the second active material in weight ratios of the first active material to the second active material (i.e., r:(1−r)) from 0.1:0.9 to 1:0 (i.e., weight ratios for the cells ranged from 10% LVPF to 100% LVPF); the anode was Li metal; and the electrolyte was 1M LiPF$_6$ in an organic solvent blend of ethylene carbonate, ethyl methyl carbonate, and dimethyl carbonate in a volume ratio (EC/EMC/DMC) of 1:1:1. The configurations for the cells of Example 1 are summarized in Table 1 below.

TABLE 1

| Cell # | Cathode Material (wt. ratio) | Anode | Electrolyte Salt & Solvent (vol. ratio) |
|---|---|---|---|
| 1A | LVPF | Li metal | 1M LiPF$_6$ EC/EMC/DMC (1:1:1) |
| 1B | LVPF/NMC622 (0.9:0.1) | Li metal | 1M LiPF$_6$ EC/EMC/DMC (1:1:1) |
| 1C | LVPF/NMC622 (0.7:0.3) | Li metal | 1M LiPF$_6$ EC/EMC/DMC (1:1:1) |
| 1D | LVPF/NMC622 (0.4:0.6) | Li metal | 1M LiPF$_6$ EC/EMC/DMC (1:1:1) |
| 1E | LVPF/NMC622 (0.1:0.9) | Li metal | 1M LiPF$_6$ EC/EMC/DMC (1:1:1) |

The prepared cells were tested as follows.

State of Charge and Depth of Discharge (DOD)

As discussed above, LVPF was found to have a very flat voltage plateau versus state of charge (SOC) or depth of discharge (DOD), which makes it difficult, if not impossible, for BMS to detect SOC or DOD by voltage. This is shown, for example, in FIGS. 1 and 2. To create the curves in FIGS. 1 and 2, the prepared cells were charged (FIG. 1) or discharged (FIG. 2) at a constant rate (0.1 C) at a temperature of about 25° C.

As shown in FIGS. 1 and 2, Cell 1A containing only LVPF had a very flat voltage versus SOC during charge and DOD during discharge. However, Cells 1B to 1E demonstrate that blending LVPF with NMC as the second active material generates slope at the beginning of charge and the end of discharge. This makes it possible for BMS to detect SOC or DOD by voltage.

Rate Capability

The prepared cells were also tested for rate capability (retention (%) of specific capacity at different current (C)-rates). The results are shown in FIG. 3. As shown, LVPF significantly improved the rate capability of NMC, particularly at higher C rates.

Capacity Retention

The prepared cells were also tested for capacity retention. The results are shown in FIG. 4. As shown, the cycle life of both LVPF and NMC was improved by blending these cathode materials. For example, the best capacity retention results were obtained in Cells 1D (r=0.4 (LVPF 40 wt. %; NMC 60 wt. %)) and Cell 1C (r=0.7 (LVPF 70 wt. %; NMC 30 wt. %)), while the worst capacity retention results were obtained in Cell 1A (r=1 (LVPF 100 wt. %)) and Cell 1E (r=0.1 (LVPF 10 wt. %; NMC 90 wt. %))

Example 2

In Example 2, single layer pouch cells were prepared having a configuration the same as Example 1, except that the second active material was LFMP (LiFe$_{0.22}$Mn$_{0.78}$PO$_4$). The configurations for the cells are summarized Table 2 below.

TABLE 2

| Cell # | Cathode Material (wt. ratio) | Anode | Electrolyte Salt & Solvent (vol. ratio) |
|---|---|---|---|
| 2A | LFMP | Li metal | 1M LiPF$_6$ EC/EMC/DMC (1:1:1) |
| 2B | LVPF/LFMP (0.1:0.9) | Li metal | 1M LiPF$_6$ EC/EMC/DMC (1:1:1) |
| 2C | LVPF/LFMP (0.3:0.7) | Li metal | 1M LiPF$_6$ EC/EMC/DMC (1:1:1) |
| 2D | LVPF/LFMP (0.6:0.4) | Li metal | 1M LiPF$_6$ EC/EMC/DMC (1:1:1) |

The prepared cells were tested as follows.

Rate Capability

The prepared cells were tested for rate capability (retention (%) of specific capacity at different current (C)-rates). The results are shown in FIG. 5. As shown, LVPF significantly improved the rate capability of LFMP, particularly at higher C rates.

The addition of LVPF also improved the processability of LFMP, demonstrating that LVPF has excellent processability. For example, blending LVPF with LFMP was found to make the slurry more stable over time and easy to coat, thereby making the both slurry preparation process and the electrode coating process more controllable and robust.

The disclosure is susceptible to various modifications and alternative means, and specific examples thereof are herein described in detail. It should be understood, however, that the disclosure is not to be limited to the particular examples or methods disclosed, but to the contrary, the disclosure is to cover all modifications, equivalents, and alternatives falling within the spirit and scope of the claims.

The invention claimed is:

1. A positive electrode material for use in a secondary battery, the positive electrode material comprising a layer obtained by blending:
   (1) a first active material consisting of a lithium vanadium fluorophosphate represented by following the Formula (1) and/or a lithium vanadium fluorophosphate derivative represented by the following Formula (2); with
   (2) a second active material consisting of the following Formula (A4) and/or the following Formula (B1),
   wherein a weight ratio of the first active material to the second active material is r:(1−r), wherein 0.4≤r≤0.9, and
   wherein either the Formula (A4) is at least 10% by weight of a total of the first active material and the second active material or the Formula (B1) is at least 10% by weight of the total of the first active material and the second active material;

$$Li_{1+x}VPO_4F \quad \text{Formula (1),}$$

wherein, in Formula (1), $0 \leq x \leq 0.15$, $$Li_{1+x}V_{1-y}M_yPO_4F_z \quad \text{Formula (2),}$$

wherein, in Formula (2), $0 \leq x \leq 0.15$; $0 < y \leq 0.5$; $0.8 \leq z \leq 1.2$; and M is one or more selected from the group consisting of Ti, Al, Mg, Mn, Fe, Co, Y, Cr, Cu, Ni, and Zr; and $$Li_{1+x}Fe_yMn_zX_bPO_4 \quad \text{Formula (A4)}$$

wherein, in Formula (A4), X is at least one transition metal selected from the group consisting of Ni, V, Y, Mg, Ca, Ba, Al, Sc, and Nd; $0 \leq x \leq 0.15$; $y>0$; $z>0$; $b \geq 0$; and optionally $y+z+b=1$, $$Li_w(Ni_xMn_yCo_zM_t)O_2 \quad \text{Formula (B1),}$$

wherein, in Formula (B1), $0.9 \leq w \leq 1.1$; $x>0$; $y>0$; $z>0$; $t \geq 0$; M is one or more selected from the group consisting of Al, B, Mg, Si, Ca, Ti, V, Cr, Fe, Cu, Zn, Y, Zr, Nb, W, Mo, Sr, Ce, Ga, and Ta; and optionally $x+y+z+t=1$.

2. The positive electrode material according to claim 1, wherein the second active material consists of the Formula (A4).

3. The positive electrode material according to claim 1, wherein the second active material consists of the Formula (B1).

4. The positive electrode material according to claim 3, wherein the Formula (B1) is selected from the group consisting of $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, and $LiNi_{0.8}Mn_{0.1}Co_{0.1}O_2$.

5. The positive electrode material according to claim 1, wherein the second active material consists of a blend of the Formula (A4) with the Formula (B1).

6. The positive electrode material according to claim 5, wherein, with regard to the weight ratio (r:(1−r)) of the first active material to the second active material, $0.6 \leq r \leq 0.9$.

7. The positive electrode material according to claim 1, wherein, with regard to the weight ratio (r:(1−r)) of the first active material to the second active material, $0.6 \leq r \leq 0.9$.

8. A lithium-ion secondary battery, the battery comprising:
a cathode including the positive electrode material according to claim 1;
an anode including a negative electrode active material; and
an electrolytic solution including a lithium salt and an organic solvent.

9. A battery system, comprising:
a plurality of batteries according to claim 8, the plurality of batteries being electrically connected; and
a battery management system configured to monitor a state of charge of the plurality of batteries based on a voltage of one or more battery of the plurality of batteries.

10. The positive electrode material according to claim 1, wherein the first active material is a lithium vanadium fluorophosphate derivative selected from the group consisting of $LiY_xV_{1-x}PO_4F$, $LiCr_xV_{1-x}PO_4F$, $LiCo_xV_{1-x}PO_4F$, $LiMn_xV_{1-x}PO_4F$, $LiTi_xV_{1-x}PO_4F$ and $LiFe_xV_{1-x}PO_4F$ where $0 < x \leq 0.5$.

11. The positive electrode material according to claim 10, wherein the first active material is a lithium vanadium fluorophosphate derivative selected from the group consisting of $LiY_xV_{1-x}PO_4F$, $LiCr_xV_{1-x}PO_4F$, $LiCo_xV_{1-x}PO_4F$, $LiMn_xV_{1-x}PO_4F$, and $LiTi_xV_{1-x}PO_4F$ where $0 < x \leq 0.5$.

12. The positive electrode material according to claim 1, wherein the second active material consists of particles of the Formula (A4) and/or the Formula (B1).

13. The positive electrode material according to claim 1, wherein the first active material consists of particles of the Formula (1) and/or the Formula (2).

14. The positive electrode material according to claim 1, wherein the active material consists of the Formula (1).

15. The positive electrode material according to claim 1, wherein the first active material consists of particles of the Formula (2).

* * * * *